(12) United States Patent
Lei

(10) Patent No.: US 10,141,737 B2
(45) Date of Patent: Nov. 27, 2018

(54) MOBILE POWER PACKS, POWER CONTROL METHODS AND ELECTRICAL CONNECTION DEVICES

(71) Applicant: SHENZHEN CARKU TECHNOLOGY CO, LTD., Shenzhen (CN)

(72) Inventor: Yun Lei, Shenzhen (CN)

(73) Assignee: SHENZHEN CARKU TECHNOLOGY CO., LTD., Longgang District, Shenzhen, Guangdong (CN)

( * ) Notice: Subject to any disclaimer, the term of this patent is extended or adjusted under 35 U.S.C. 154(b) by 215 days.

(21) Appl. No.: 15/043,624

(22) Filed: Feb. 15, 2016

(65) Prior Publication Data

US 2016/0241027 A1    Aug. 18, 2016

(30) Foreign Application Priority Data

Feb. 13, 2015    (CN) .......................... 2015 1 0080573

(51) Int. Cl.
*H02J 1/00*        (2006.01)
(52) U.S. Cl.
CPC ..................... *H02J 1/00* (2013.01)
(58) Field of Classification Search
CPC ....................................................... H02J 1/00
See application file for complete search history.

(56) References Cited

U.S. PATENT DOCUMENTS

| | | | | | |
|---|---|---|---|---|---|
| 5,189,359 | A | * | 2/1993 | Kronberg | H02J 7/0034 320/103 |
| 5,623,550 | A | * | 4/1997 | Killion | H01L 23/642 307/127 |
| 6,130,519 | A | * | 10/2000 | Whiting | H02J 7/0034 320/105 |
| 6,624,535 | B2 | * | 9/2003 | Morrow | H02J 7/0024 307/43 |

* cited by examiner

*Primary Examiner* — Robert Deberadinis
(74) *Attorney, Agent, or Firm* — Jun He Law Offices P.C.; James J. Zhu

(57) ABSTRACT

The application discloses a mobile power pack, a power control circuit and an electrical connection device. The power control circuit comprises: a voltage detecting module configured to detect a voltage of an external power source and generate a voltage detection signal indicative of the voltage of the external power source; a control module configured to receive the voltage detection signal and generate a coupling control signal according to the voltage detection signal; a coupling module configured to operably couple a first power source and a second power source, receive the coupling control signal, and in response to the coupling control signal change the way the first power source is coupled with the second power source to control the first power source and the second power source coupled together to output electric energy under different output voltages. The power control circuit of the application can automatically control the coupled power source to output electric energy under different voltage in response to the voltage of the external power source.

24 Claims, 6 Drawing Sheets

MOBILE POWER PACKS, POWER CONTROL METHODS AND ELECTRICAL CONNECTION DEVICES

CROSS-REFERENCE TO RELATED APPLICATION

The present application claims priority to Chinese Patent Application No. 201510080573.4, filed with the State Intellectual Property Office of P. R. China on Feb. 13, 2015, the entire contents of which are incorporated herein by reference.

TECHNICAL FIELD

The present application relates to power supply technology, and more particularly, to power control circuits, mobile power packs and electrical connection devices.

BACKGROUND

A car battery is used for supplying power to various electrical devices of a car. Moreover, the car battery can also be used for starting a car engine. Generally speaking, the car engine, after being started, can charge the car battery to ensure sufficient power of the car battery. However, for some reasons such as aging, damage or over-discharging, the car battery may not have enough power for starting the car. Some emergency power source products have been developed for starting car in emergency when the car battery fails.

However, the car battery generally has two specifications, i.e. 12 V and 24 V, which can start the gasoline engine and the diesel engine, respectively. The conventional car emergency power source products can only output one of the two specifications 12 V and 24 V, and thus can only be used for starting one of the gasoline engine and the diesel engine. Such products can not satisfy demands of emergency starting of both the two types of engines.

Therefore, there is a continued need for improving the mobile power pack.

SUMMARY

At least an objective of the present application is to provide a mobile source pack and an electrical connection device to solve at least one problem of the prior art technology.

According to an aspect of the present application, a power control circuit is provided which includes: a voltage detecting module configured to detect a voltage of an external power source and generate a voltage detection signal indicative of the voltage of the external power source; a control module configured to receive the voltage detection signal and generate a coupling control signal according to the voltage detection signal; a coupling module configured to operably couple a first power source with a second power source, and receive the coupling control signal, in response to the coupling control signal, change the way the first power source and the second power source are coupled so that the first power source and the second power source are coupled to output electric energy under different output voltages.

In some embodiments, the control module is further configured to compare the voltage detection signal with a first voltage range and a second voltage range, and generate the coupling control signal of coupling the first power source and the second power source in series when the voltage detection signal is within the first voltage range or generate the coupling control signal of coupling the first power source and the second power source in parallel when the voltage detection signal is within the second voltage range.

In some embodiments, the first voltage range includes a range from 14.4V to 25.4V, and the second voltage range includes a range from 8.1V to 12.7V.

In some embodiments, the control module is further configured to generate a warning signal when the voltage detection signal is between the first voltage range and the second voltage range.

In some embodiments, the coupling module includes: a first terminal and a second terminal configured to couple to a positive electrode and a negative electrode of the first power source, respectively; a third terminal and fourth terminal configured to couple to a positive electrode and a negative electrode of the second power source, respectively; wherein the first power source and the second power source are coupled to output electric energy between the third terminal and the second terminal.

In some embodiments, the coupling module includes: a first switch coupled between the first terminal and the third terminal; a second switch coupled between the first terminal and the fourth terminal; a third switch coupled between the second terminal and the fourth terminal; the control module is configured to compare the voltage detection signal with the first voltage range and the second voltage range, generate the coupling control signal of switching on the second switch and switching off the first and third switches when the voltage detection signal is within the first voltage range, and generate the coupling control signal of switching on the first and third switches and switching off the second switch when the voltage detection signal is within the second voltage range.

In some embodiments, the coupling module includes: a switch driving module configured to receive the coupling control signal and provide it to the first, second and third switches to control the on/off state of the first, second and third switches, wherein the switch driving module is further configured to prohibit switching on the second switch while the first switch and/or the third switch are switched on.

In some embodiments, the external power source is coupled between the third terminal and the second terminal, and the voltage detecting module is coupled between the third terminal and the second terminal to detect the voltage of the external power source.

In some embodiments, the voltage detecting module includes a voltage divider configured to divide the detected voltage of the external power supply to obtain the voltage detection signal.

In some embodiments, the power control circuit further includes: a current detecting module configured to detect an output current of the first power source and the second power source coupled together, and generate an over-current detection signal when the output current exceeds a predetermined current range; wherein the control module is further configured to receive the over-current detection signal and generate the coupling control signal of prohibiting the first power source and the second power source from outputting electric energy in response to the over-current detection signal.

In some embodiments, the power control circuit further includes: a current detecting module configured to detect an output current of the first power source and the second power source coupled together, and generate an over-current detection signal when the output current exceeds a predetermined current range; wherein the control module is further configured to receive the over-current detection signal and generate the coupling controlling signal of prohibiting the first power source and the second power source from outputting electric energy in response to the overcurrent detection signal.

In some embodiments, the power control circuit further includes: a polarity detecting module configured to detect a voltage polarity of the external power source; wherein the control module is further configured to generate the coupling control signal according to the detected voltage polarity of the external power source to prohibit or permit the electric energy output from the first power source and the second power source coupled together.

In some embodiments, the power control circuit further includes: a polarity detecting module configured to detect a voltage polarity of the external power source; the control module is further configured to generate the coupling control signal according to the detected voltage polarity of the external power source to change the way the first power source and the second power source are coupled such that the external power source is coupled to the first power source and the second power source coupled together in a predetermined polarity.

In some embodiments, the control module is further configured to receive a manual input signal, and generate the coupling control signal of permitting the electric energy output from the first power source and the second power source coupled together in response to the manual input signal.

In some embodiments, the control module is further configured to tracking the timing of the electric energy output responsive to the manual input signal, and output the coupling controlling signal of prohibiting the electric energy output from the first power source and the second power source coupled together after a predetermined period.

According to another aspect of the present application, a mobile power pack is provided which is comprising the power control circuit of the above aspect and the first and second power sources.

In some embodiments, the first power source includes a first battery pack and the second power source includes a second battery pack.

In some embodiments, the first battery pack and the second battery pack is comprised of lithium iron phosphate batteries, and each battery pack has a voltage ranging from 8V to 14.4V with tolerance less than 0.3V; or the first battery pack and the second battery pack is comprised of lithium cobalt oxide batteries, and each battery pack has a voltage ranging from 8.1V to 12.6V with tolerance less than 0.3V.

In some embodiments, the mobile power pack is used for starting an engine.

According to another aspect of the present application, a power control method is provided which is used for controlling electric energy output from a power source of a first power source and a second power source. The method includes: detecting a voltage of an external power source; and changing the way the first power source and the second power source are coupled so as to control the first power source and the second power source coupled together to output electric energy under different output voltages.

In some embodiments, the step of changing the way the first power source and the second power source are coupled includes: comparing the detected voltage of the external power source with a first voltage range and a second voltage range; and coupling the first power source with the second power source in series when the detected voltage of the external power source is within the first voltage range, or coupling the first power source with the second power source in parallel when the detected voltage of the external power supply is within the second voltage range.

In some embodiments, the first voltage range includes a range from 14.4V to 25.4V, and the second voltage range includes a range from 8.1V to 12.7V.

In some embodiments, the method further includes: detecting an output current of the first power source and the second power source coupled together; comparing the output current with a predetermined reference current; and prohibiting the first power source and the second power source from outputting electric energy when the output current exceeds the predetermined reference current.

In some embodiments, the method further includes: detecting a polarity of the external power source; and determining whether to prohibit the electric energy output from the first power source and the second power source coupled together according to the detected polarity of the external power source.

In some embodiments, the method further includes: detecting a polarity of the external power source; and changing the way the first power source and the second power source are coupled according to the detected polarity of the external power source to couple the external power source with the first power source and the second power source coupled together in a predetermined polarity.

In some embodiments, the method is used for starting an engine.

The above referenced power control circuits and methods of the application can automatically control the power source to output electric energy under different voltages in response to the voltage of the external power source, such that the electrical fault and danger caused by the mismatching of the voltages of the power source and the external power source can be avoided.

According to another aspect of embodiments of the present application, an electrical connection device is provided, which includes: a coupling module having a first terminal, a second terminal, a third terminal and a fourth terminal, wherein the first terminal is operably coupled to one of the third and fourth terminals, and the second terminal is operably coupled the other of the third and fourth terminals; a polarity detecting module configured to detect a first polarity between the first terminal and the second terminal and detect a second polarity between the third terminal and the fourth terminal; and a control module configured to generate a coupling control signal according to the detected first and second polarities in order to control the way the first and second terminals are coupled with the third and fourth terminals such that the first polarity between the first terminal and the second terminal is same as the second polarity between the third terminal and the fourth terminal.

In some embodiments, the polarity detecting module includes: a first optocoupler coupled between the first terminal and the second terminal, and configured to generate a first polarity detection signal indicating the first polarity according to a voltage difference between the first terminal and the second terminal; and a second optocoupler coupled between the third terminal and the fourth terminal, and configured to generate a second polarity detection signal indicating the second polarity according to a voltage difference between the third terminal and the fourth terminal.

In some embodiments, the polarity detecting module further includes: a first voltage divider configured to divide the voltage difference between the first terminal and the second terminal and pass the divided voltage to an input terminal of the first optocoupler; a second voltage divider configured to divide the voltage difference between the third terminal and the fourth terminal and pass the divided voltage to an input terminal of the second optocoupler; wherein the first optocoupler generates the first polarity detection signal indicating the first polarity according to the divided voltage difference between the first terminal and the second terminal; and the second optocoupler generates the second polarity detection signal indicating the second voltage polarity according to the divided voltage difference between the third terminal and the fourth terminal.

In some embodiments, the electrical connection device further includes: a first voltage detecting module coupled between the first terminal and the second terminal to detect a voltage amplitude therebetween; a second voltage detecting module coupled between the third terminal and the fourth terminal to detect a voltage amplitude therebetween; the control module is further configured to compare the voltage amplitude between the first and second terminals with the voltage amplitude between the third and fourth terminals, and generate the coupling control signal of disconnecting the first and second terminals from the third and fourth terminals when the two voltage amplitudes do not match with each other.

In some embodiments, the coupling module further includes: a first switch coupled between the first terminal and the third terminal; a second switch coupled between the first terminal and the fourth terminal; a third switch coupled between the second terminal and the third terminal; a fourth switch coupled between the second terminal and the fourth terminal; the controlling module is further configured to generate the coupling control signal of switching on the first and fourth switches and switching off the second and third switches, or the coupling control signal of switching on the second and third switches and switching off the first and fourth switches according the first polarity and the second polarity.

In some embodiments, the control module is further configured to compare the voltage amplitude between the first and second terminals with the voltage amplitude between the third and the fourth terminals; and generate the coupling control signal of switching off the first, second, third and fourth switches when the two voltage amplitudes do not match with each other.

In some embodiments, the control module is further configured to record how long the coupling control signal of maintaining coupling of the first and second terminals with the third and fourth terminals lasts, and generate the coupling control signal of disconnecting the first and second terminals from the third and fourth terminals when the outputting lasts more than a first predetermined period; the control module is further configured to, after a second predetermined period has passed since the coupling control signal of disconnecting the first and second terminals from the third and fourth terminals is output, generate the coupling control signal of coupling the first and second terminals with the third and fourth terminals again based on the detected first polarity and second polarity.

In some embodiments, the electrical connection device further includes: a first polarity orientation module having two input terminals coupled to the first terminal and the second terminal, respectively, wherein the first polarity orientation module is configured to convert the voltage difference received between the two input terminals into a voltage with a predetermined polarity; and/or a second polarity orientation module having two input terminals coupled to the third terminal and the fourth terminal, respectively, wherein the second polarity orientation module is configured to convert the voltage difference received between the two input terminals into a voltage with a predetermined polarity.

In some embodiments, the electrical connection device further includes: a voltage converting module configured to receive an output voltage from the first polarity orientation module and/or the second polarity orientation module, and convert it to a voltage having a predetermined amplitude for supplying other components of the electrical connection device.

In some embodiments, the electrical connection device is used for starting an engine, wherein the first terminal and the second terminal are coupled to positive and negative electrodes of a backup power source, and the third terminal and the fourth terminal are coupled to positive and negative electrodes of a failed power source associated with the engine.

The electrical connection devices of the present application can automatically adjust the way two power sources are coupled via the electrical connection devices according to the polarity of the two power sources, thereby assuring correct connection of the positive and negative electrodes of the two power sources.

The foregoing has outlined, rather broadly, features of the present application. Additional features of the present application will be described, hereinafter, which form the subject of the claims of the present application. It should be appreciated by those skilled in the art that the conception and specific embodiments disclosed herein may be readily utilized as a basis for modifying or designing other structures or processes for carrying out the objectives of the present application. It should also be realized by those skilled in the art that such equivalent constructions do not depart from the spirit and scope of the present application as set forth in the appended claims.

BRIEF DESCRIPTION OF THE DRAWINGS

The aforementioned features and other features of the present application will be fully understood by reading the following description by referring to the accompanying drawings and the appended claims. It will be understood that, these accompanying drawings merely illustrate certain embodiments in accordance with the present application and should not be considered as limitation to the scope of the present application. Unless otherwise specified, the accompanying drawings need not be proportional, and similar reference characters generally denote similar elements.

DETAILED DESCRIPTION

The following detailed description refers to the accompanying drawings which is a part of the present application. The illustrative embodiments described in the detailed description, the accompanying drawings and the claims are not limiting, and other embodiments may be adopted, or modifications may be made without deviating from the spirit and subject of the present application. It should be understood that the various aspects of the present application described and graphically presented herein may be arranged, replaced, combined, divided and designed in many different configurations, and these different configurations are implicitly comprised in the present application.

First Aspect of the Application

Figure 1:
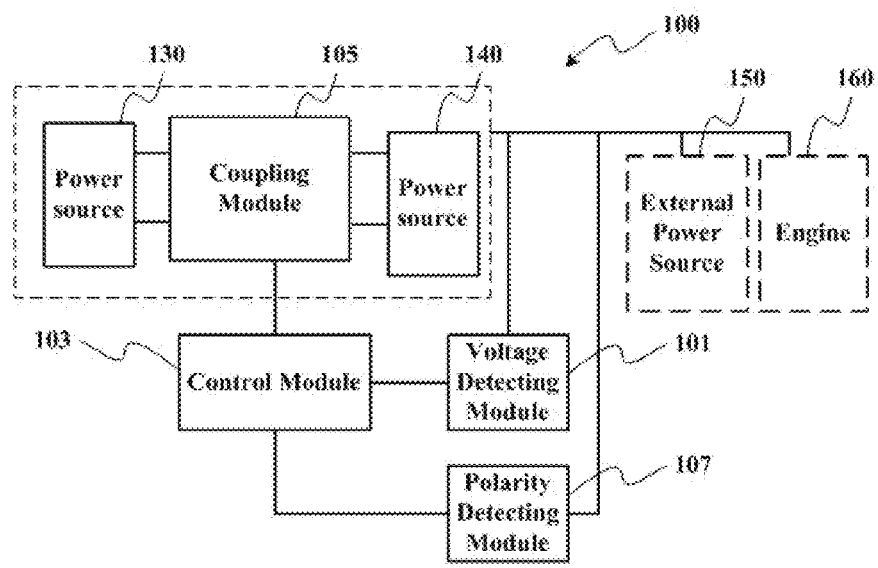
FIG. 1 is a circuit diagram illustrating a power control circuit 100 according to an exemplary embodiment of the present application.

FIG. 1 is a circuit diagram illustrating a power control circuit 100 according to an exemplary embodiment of the present application. In certain embodiments, the power control circuit 100 can be coupled to two or more power source (e.g. batteries or battery packs) to adjust an output voltage of the coupled power sources. In other words, the power sources with the power control circuit 100 forms a mobile power pack of a variable output voltage. The mobile power pack can adjust its output voltage according to the voltage requirement of an external load, thereby outputting electric energy under different output voltage levels. In some embodiments, the mobile power pack can be used for starting engines of cars, motorcycles, vehicles or other mechanical and electrical equipment in emergency. Accordingly, the power control circuit has a function of detecting the starting voltage of the engine, for example, determining the required starting voltage of the engine by detecting a voltage of an engine battery, such that the mobile power pack can automatically output the corresponding voltage according to the detected voltage requirement.

In the following paragraphs, the structure, process and function of the power control circuit 100 and the mobile power pack using the power control circuit 100 will be described with reference to a specific application of vehicle starting. However, it will be appreciated that this is not a limitation to the power control circuit of the present application. A person skilled in the art would appreciate that the power control circuit and the mobile power pack can also be used in other applications such as charging an external power source (e.g. a vehicle battery, a rechargeable battery) and so on.

As shown in FIG. 1, the power control circuit 100 is coupled to a first power source 130 and a second power source 140. For example, the first power source 130 or the second power source 140 may be a battery pack having one or more batteries or other components capable of storing or supplying electrical energy. In some embodiments, rating voltages of the battery packs are equal to each other, which may not be lower than 12.6V. For example, the battery packs of the two power sources 130 and 140 may include lithium iron phosphate batteries, and have a rating voltage ranging from 8.1V to 14.4V with a tolerance of 0.3V or less. Alternatively, the battery packs of the two power sources 130 and 140 may include lithium cobalt oxide batteries, and have a rating voltage ranging from 8.1V to 12.6V with a tolerance of 0.3V or less. The power control circuit 100 controls the way the two power sources 130 and 140 are coupled with an external power source 150 and a load 160 that are coupled with each other. In some embodiments, the load 160 may be an engine, or specifically, a starting motor (e.g. a direct current universal motor) disposed within the engine. In normal conditions, the load 160 is powered by the external power source 150, so that the starting voltage of the engine 160 is generally equal to the output voltage of the external power source 150. However, for some reasons of the external power source 150 itself, e.g. aging, damage or over-discharging, the external power source 150 may not have enough power, and thereby can not provide sufficient starting current to start the load 160 under the starting voltage requirement. It could be noted that, in the embodiments shown in FIG. 1, each of the external power source 150 and the load 160 has a terminal coupled to the power control circuit 100, while the other terminals of the external power source 150 and the load 160 are not shown. In certain embodiments, the terminals not shown can be coupled to a reference potential such as ground. Similarly, only one of the terminals of the power control circuit 100 is shown, and the other terminal of the power control circuit 100 may also be coupled to the reference potential such as ground. In some embodiments, the power control circuit may have its two output terminals coupled to the two input terminals of the external power source 150 and the two input terminals of the load 160, respectively.

The power control circuit 100 includes a voltage detecting module 101, which is coupled to the external power source 150 to detect the voltage of the external power source 150. The voltage detecting module 101 has two input terminals, which are coupled to the positive and negative electrodes of the external power source 150 respectively to obtain the voltage amplitude of the output voltage of the external power source 150. In other words, the voltage detecting module 101 can also be coupled between the two output terminals of the power control circuit 100.

The voltage detecting module 101 generates a voltage detection signal according to the detected voltage of the external power source 150. The voltage detection signal is used for indicating the voltage amplitude of the external power source 150. In some embodiments, the voltage detecting module 101 can use the sampled voltage amplitude of the external power source 150 as the voltage detection signal. For example, the voltage detection signal is an analog signal equal to the detected voltage amplitude of the external power source 150. In some embodiments, the voltage detecting module 101 can also process the sampled voltage amplitude, e.g. dividing the voltage, to obtain a signal proportional to the voltage amplitude, and then use the signal as the voltage detection signal. It will be appreciated that the voltage detection signal may be either an analog signal or a digital signal. For example, the voltage detecting module 101 may include an analog/digital signal converter to convert signal from analog form to digital form.

The power control circuit 100 further includes a control module 103 and a coupling module 105. The control module 130 is coupled to the voltage detecting module 101 to receive the voltage detection signal, and generates the coupling control signal according to the voltage detection signal. For example, the control module 103 may compare the voltage detection signal with different predetermined voltages or voltage ranges, and generate different coupling control signals based on the different comparison results.

The coupling module 105 operably couples the first power source 130 with the second power source 140. Specifically, the coupling module 105 receives the coupling control signal from the control module 103, and in response to the coupling control signal, changes the way the first power source 130 is coupled with the second power source 140. For example, the coupling module 105 can include several terminals such as four terminals which are respectively coupled to the negative and positive electrodes of the first power source 130 and the second power source 140. The coupling module 105 can also include several conducting wires each being coupled to two terminals of the several terminals of the coupling module 105. Switches such as MOS switches or relays can be coupled in the conducting wires. In this way, the on/off state of these switches can be controlled by the coupling control signal, to couple the terminals of the coupling module 105 in different circuit paths, thereby coupling the first power source 130 with the second power source 140 in different coupling modes. For example, the coupling module 105 may couple the positive electrode of the first power source 130 with the positive electrode of the second power source 140, and couple the negative electrode of the first power source 130 with the negative electrode of the second power source 140, to couple the two power sources in parallel. When the output voltage of the first power source 130 is equal to that of the second power source 140, the output voltage of the two power sources coupled in parallel is equal to the output voltage of the first and second power sources. For another example, the coupling module 105 may couple the positive electrode of the first power source 130 with the negative electrode of the second power source 140, to couple the two power sources in series with each other. Furthermore, the negative electrode of the first power source 130 may be grounded and the positive electrode of the second power source 140 may be used for voltage outputting. In this way, when the output voltage of the first power source 130 is equal to that of the second power source 140, the output voltage of the two power sources coupled in series are two times the output voltage of the first and second power sources. In some cases, the coupling module 105 may also disconnect the first power source 130 from the second power source 140 according to the coupling control signals, or optionally disconnect the two power sources from the external power source 150, such that no voltage can be outputted (that is, the output voltage is zero) to the external power source 150. In short, the coupling module 150 can change the way the first power source 130 and the second power source 140 are coupled, i.e. the coupling of the first power source 130 and the second power source 140 according to the coupling control signal, so as to control the first power source 130 and the second power source 140 coupled together to output electric energy under difference output voltages.

It can be seen that when the mobile power pack having the power control circuit 100 is used for starting an engine in emergency, by detecting the voltage of the external power source 160 and adjusting its output voltage based on the detected voltage, the mobile power pack can automatically match the starting voltage demands for engines of different standards, thereby improving its compatibility.

For example, the control module 103 may compare the voltage detection signal with a first voltage range and a second voltage range. In this case, the first voltage range may be substantially equal to or slightly less than an output voltage of a fully-charged 24V diesel engine battery, e.g. ranging from 16.2V to 25.4V. Moreover, the second voltage range may be substantially equal to or slightly less than an output voltage of a fully-charged 12V gasoline engine battery, e.g. ranging from 8.1V to 12.7V. When the voltage detection signal is within the first voltage range, the control module 103 can generate the coupling control signal of coupling the first power source 130 with the second power source 140 in series, to superimpose the output voltages of the two coupled power sources. When the voltage detection signal is within the second voltage range, the control module 103 can generate the coupling control signal of coupling the first power source 130 with the second power source 140 in parallel, to make the output voltage of the two power sources coupled together equal to the output voltage of the first and second power sources. In other words, if it is detected that the external power source 150 is the 12V gasoline engine battery, the output voltage of the mobile power pack is about 12V; and if it is detected that the external power source 150 is the 24V diesel engine battery, the output voltage of the mobile power pack is about 24V.

Accordingly, when the control module 103 determines that the voltage detection signal is out of the first voltage range and the second voltage range after the above comparison, it may generate the coupling control signal of disconnecting the first power source 130 from the second power source 140. The coupling control signal can prevent the first power source 130 and the second power source 140 from outputting electric energy to the external source 150 and the load 160. It can be understand that the first voltage range and the second voltage range are generally different from each other and do not overlap with each other. For the voltage detection signal between the first voltage range and the second voltage range, it is generally determined that the detected external power source 150 is fully charged or is a power source that does not match with the predetermined battery standards. For the latter situation, the control module 103 may generate a warning signal, which can be provided to a user through a screen, a speaker or other information prompting modules. In some embodiments, when the voltage detection signal falls within a range from 13.5V to 14.4V, the control module 103 may generate the warning signal.

In some embodiments, the power control circuit 100 may further include a polarity detecting module 107 to detect a voltage polarity of the external power source 150. The voltage polarity refers to how the electrodes of the external power source 150 are coupled to the voltage output terminals of the mobile power pack. Accordingly, the control module 103 may generate the coupling control signal according to the detected polarity of the external power source 150 to prohibit or permit the electric energy output from the first power source 130 and the second power source 140 coupled together. For example, if it is determined that the positive electrode of the external power source 150 is coupled to an electrode with a higher potential of the two power sources coupled together, then the electric energy output is permitted, otherwise the electric energy output is prohibited. This can avoid circuit failure caused by the reverse connection with the positive and negative electrodes of the external power source 150.

Optionally, in some embodiments, the control module 130 may also generate the coupling control signal according to the detected voltage polarity of the external power source 150, and the coupling control signal gets the external power source 150 coupled to the first power source 130 and the second power source 140 coupled together in a predetermined polarity. Specifically, if it is found that the positive electrode of the external power source 150 is coupled to an electrode of the coupled two power sources with the higher potential, then the electric energy output is permitted. Otherwise, the way the external power source 150 is coupled with the two power sources is changed or switched such that the positive electrode of the external power source 150 is coupled to the electrode of the two power sources with the higher potential, then the electric energy output is permitted. The auto-switching structure also avoids the circuit failure caused by the reverse connection of the positive and negative electrodes, which is more convenient for use.

It should be noted that the aforementioned control manner of changing the way the two power sources are coupled according to the polarity detection and voltage detection can both be implemented in the control module 103. For example, the polarity detection may have a higher priority, and the voltage detection may have a lower priority. When performing the determining or comparing process to generate the coupling control signal, the control module 103 may first compare the polarity detection results, and if the polarity comparison result permits the electric energy output from the mobile power pack, the control module 103 proceeds to compare the voltage and generate the coupling control signal accordingly.

In some embodiments, the power control circuit may also have manual coupling control function. Specifically, an input module may be provided to receive a manual input such as an input for switching the output voltage between 12V and 24V. The input module converts the manual input to a manual input signal. The manual input signal can be directly provided to the control module 103. Accordingly, the control module 103 can generate the coupling control signal of instructing the first power source and the second power source coupled together to output electric energy, thereby controlling the operation of the coupling module 105. In some embodiments, the control module 103 may track the timing of the electric energy output responsive to the manual input signal, and output the coupling controlling signal of prohibiting the electric energy output from the first power source 130 and the second power source 140 coupled together if the time for energy outputting exceeds a predetermined period. Such arrangement can avoid the mobile power pack from overcharging the external power source 150 and load 160 continuously.

Figure 2:
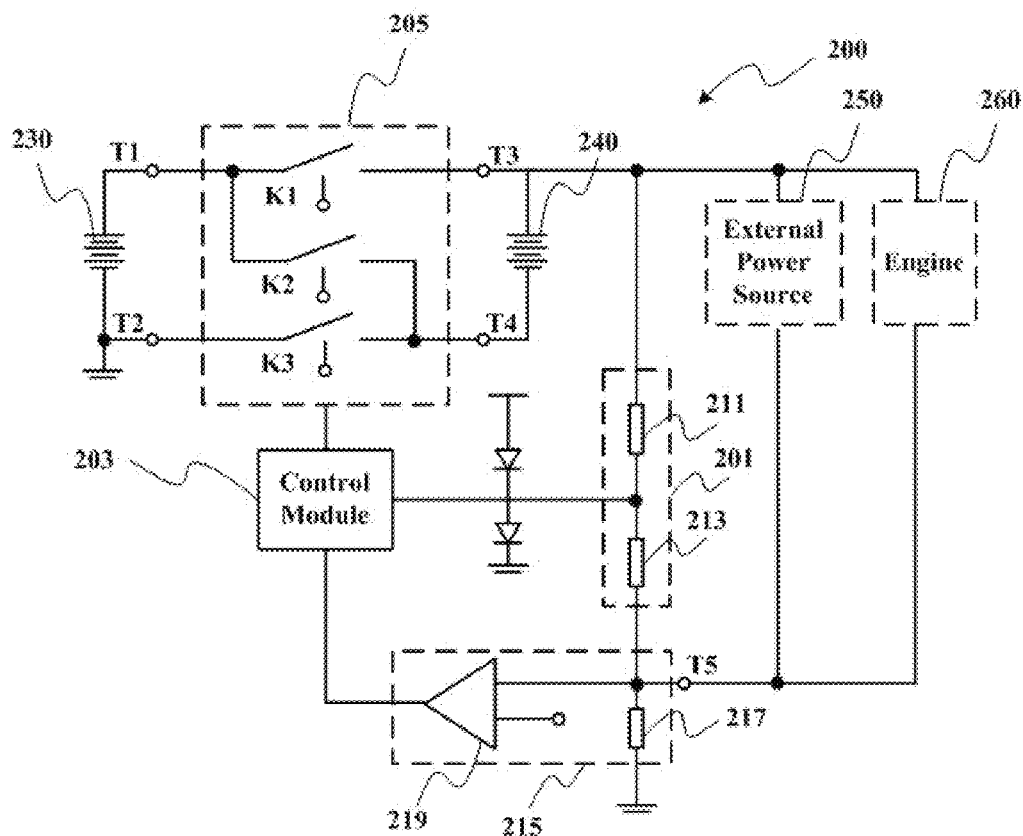
FIG. 2 is a circuit diagram illustrating a power control circuit 200 according to an exemplary embodiment of the present application.

FIG. 2 is a circuit diagram illustrating a power control circuit 200 according to an exemplary embodiment of the present application. The power control circuit 200 is used for coupling and controlling a first power source 230 and a second power source 240, to use them as a mobile power pack to power an external power source 250 and an engine 260.

As shown in FIG. 2, the power control circuit 200 includes a voltage detecting module 201, a control module 203 and a coupling module 205. The coupling module 205 has a first terminal T1 and a second terminal T2, which are coupled to a positive electrode and a negative electrode of the first power source 230 respectively. The coupling module 205 also has a third terminal T3 and a fourth terminal T4, which are respectively coupled to a positive electrode and a negative electrode of the second power source 240. The second terminal T2 is coupled to a reference potential such as ground, and the third terminal T3 is coupled to the external power source 250 and the engine 260, to make the first power source 230 and the second power source 240 coupled together generate an output voltage and output electric energy between the third terminal T3 and the second terminal T2. When a terminal of the external power source 250 and the engine 260 is also coupled to the reference potential or a potential close to the reference potential, it is equivalent that the terminal is coupled to the second terminal T2.

The voltage detecting module 201 is used for detecting the voltage of the external power source 250. Specifically, two output terminals of the voltage detecting module 201 are coupled to the third terminal T3 and the reference potential (e.g. ground), respectively, and the external power source 250 is also coupled between the third terminal T3 and the reference potential. In the embodiment shown in FIG. 2, the voltage detecting module includes a voltage divider consisting of a first detecting resistor 211 and a second detecting resistor 213. Thus, the voltage detecting module 201 can divide the voltage of the external power source 250 sampled at its input terminals to obtain the voltage detection signal accordingly. The voltage detection signal varies with the voltage of the external power source 250.

The control module 203 receives the voltage detection signal and compares the voltage detection signal with a predetermined first voltage range and a predetermined second voltage range. The control module 203 generates the coupling control signal depending on the different voltage comparison results.

The coupling module 205 includes a first switch K1, a second switch K2 and a third switch K3. The first switch K1 is coupled between the first terminal T1 and the third terminal T3; the second switch K2 is coupled between the first terminal T1 and the fourth terminal T4; and the third switch K3 is coupled between the second terminal T2 and the fourth terminal T4. Under the control of the coupling control signal, the on and off states of the switches may change such that the way the first power source 230 and the second power source 240 are coupled may change accordingly. Specifically, when the voltage detection signal is within the first voltage range, the control module 203 generates the coupling control signal of switching on the second switch K2 and switching off the first and third switches K1 and K3, which makes the positive electrode of the first power source 230 be coupled to the negative electrode of the second power source 240, and thereby the two power sources are coupled in series. The two power sources coupled in series outputs at the third terminal T3 a voltage equal to a sum of the respective voltages of the two power sources. When the voltage detection signal is within the second voltage range, the control module 203 generates the coupling control signal of switching off the second switch K2 and switching on the first and third switches K1 and K3, which makes the positive and negative electrodes of the first power source 230 be coupled to the positive and negative electrodes of the second power source 240, respectively, thereby coupling the two power source in parallel. As the output voltages of the two power sources are equal to each other, the output voltage does not change after the two power sources are coupled in parallel.

Figure 3:
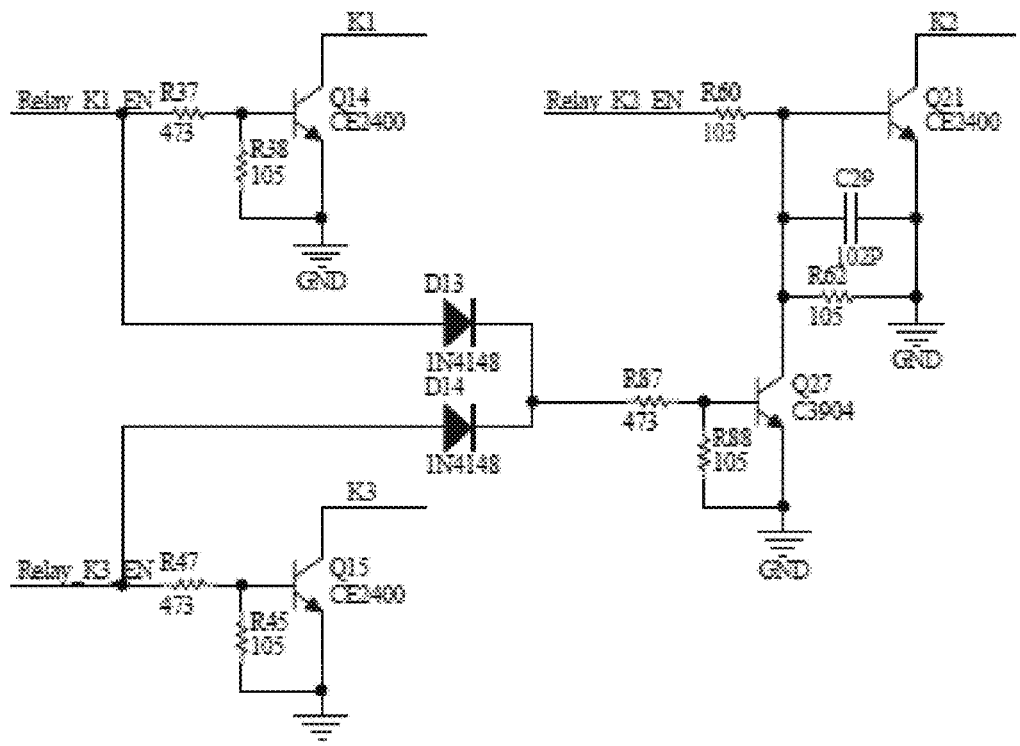
FIG. 3 is a circuit diagram illustrating a switch driving module of the power control circuit shown in FIG. 2.

The circuit as shown in FIG. 2 requires that the first switch K1, the second switch K2 and the third switch K3 are not switched on simultaneously. To avoid switching on the three switches simultaneously, in some embodiments, the coupling control signal is provided to the first switch K1, the second switch K2 and the third switch K3 through a switch driving module as shown in FIG. 3. The switch driving module can prohibit switching on the second switch K2 when the first switch K1 and/or the third switch K3 are switched on. In other words, the second switch K2 can not be switched on as long as at least one of the first switch K1 and the third switch K3 is switched on.

FIG. 3 shows a circuit diagram of the switch driving module. Specifically, the first switch K1, the second switch K2 and the third switch K3 are all active-low switches, that is, the switches are switched on when their control terminals are at the low level. The coupling control signal includes a Relay K1 signal, a Relay K2 signal and a Relay K3 signal. When the Relay K1 signal is at the high level, the transistor Q14 is in the conducting state, with its collector at the low level, thereby turning on the first switch K1. Similarly, when the Relay K3 signal is at the high level, the third switch K3 is turned on. Moreover, when the Relay K1 signal and the Relay K3 signal are both at the low level, the diodes D13 and D14 are cut off, thereby the transistor Q27 is cut off. The voltage at the collector of the transistor Q21 is determined by the Relay K2 signal: when the Relay K2 signal is at the high level, the collector of the transistor Q21 is at low level and the second switch K2 is switched on. However, if one of the Relay K1 signal and the Relay K3 signal is at the high level, the diode D13 or D14 will be in conducting state, such that the transistor Q27 is in the conducting state. Then the voltage of the base of the transistor Q21 is pull down to cut off the transistor Q21. In this way, the control terminal of the second switch K2 can be kept at the high level and the second switch K2 may not be switched on.

Still referring to FIG. 2, the power control circuit 200 also includes a current detecting module 215 for detecting an output current of the first power source 230 and the second power source 240 coupled together. The output current is generally applied to the engine 260 when it is used for starting the engine. The current detecting module 215 can generate an over-current detection signal when the output current exceeds a predetermined current range. The control module 203 receives the over-current detection signal, and in response to the over-current detection signal, generates the coupling control signal of prohibiting the first power source and the second power source from outputting current.

Specifically, the current detecting module 215 includes a detecting resistor 217 and a comparator 219. The detecting resistor 217 is used for sampling the current flowing from the third terminal T3 to the reference potential. Generally, the resistance of the detecting resistor 217 is much smaller than that of the external power source 250 and the voltage divider, and thus, it may not affect the detecting of the voltage detecting module 201 to the voltage of the external power source 250. Moreover, when started in emergency, the resistance of an internal resistor of the engine 260 is much smaller than the resistance of the external power source 250 and the voltage divider. Therefore, all or at least a major portion of the output current of the first power source 230 and the second power source 240 flows through the engine 260.

The output current generates a voltage across the detecting resistor 217, which is proportional to the detected output current. The comparator 219 compares the voltage across the detecting resistor 217 with a predetermined reference voltage. If the voltage exceeds the predetermined reference voltage, which indicates that the detected output current is too large, then the comparator outputs the over-current detection signal indicating that the output current exceeds the predetermined current range. In this way, the control module 203 can switch off the first switch K1, the second switch K2 and the third switch K3 after receiving the over-current detection signal indicating that the output current exceeds the predetermined current range.

In some embodiments, the power control circuit may further includes a polarity detecting module (not shown) to detect the polarity of the external power source 250. Accordingly, the control module 203 can generate a coupling control signal according to the detected voltage polarity of the external power source to prohibit or permit the electric energy output from the first power source 230 and the second power source 240 coupled together. In some embodiments, the control module 203 can also generate a coupling control signal according to the detected voltage polarity of the external power source 250. The coupling control signal can make the external power source 250 be coupled to the first power source 230 and the second power source 240 coupled together in a predetermined polarity.

Figure 4:
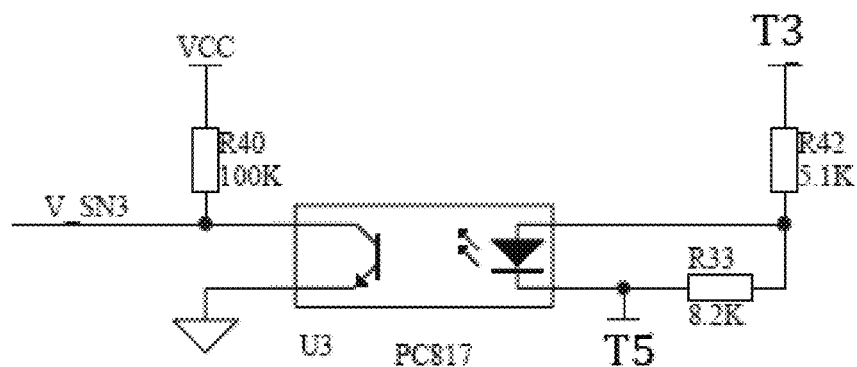
FIG. 4 is a circuit diagram illustrating a polarity detecting module of the power control circuit shown in FIG. 2.

FIG. 4 is a circuit diagram illustrating the polarity detecting module of the power control circuit 200 shown in FIG. 2. As shown in FIG. 4, the polarity detecting module includes a voltage divider consisting of a resistor R42 and a resistor R33. The voltage divider is coupled to the voltage detecting module 201 in parallel, that is, being coupled between the third terminal T3 and the reference potential or a potential close to the reference potential (e.g. the terminal T5 shown in FIG. 2). Moreover, the polarity detecting module also includes an optocoupler U3. When the third terminal T3 is coupled to the positive electrode of the external power source 250, the optocoupler U3 is in the conducting state such that the output terminal V_SN3 of the optocoupler outputs the polarity detection signal of a low level. In response to the polarity detection signal of the low level, the control module 203 determines that the positive and negative electrodes of the external power source 250 are correspondingly coupled to the positive and negative electrodes of the first power source 230 and second power source 240, and thus, the electric energy output from the coupled power sources is permitted to power the external power source 250 or the engine 260. In contrast, if the third terminal T3 is coupled to the negative electrode of the external power source 250, then the optocoupler U3 is cut off such that the output terminal V_SN3 of the optocoupler may generate the polarity detection signal of a high level. In response to the polarity detection signal of the high level, the control module 203 determines that the positive and negative electrodes of the external power source 250 is reversely coupled to the positive and negative electrodes of the first power source 230 and the second power source 240, and thus, the electric energy output from the coupled power sources is prohibited to avoid damage to the external power source 250 or the engine 260.

Figure 5:
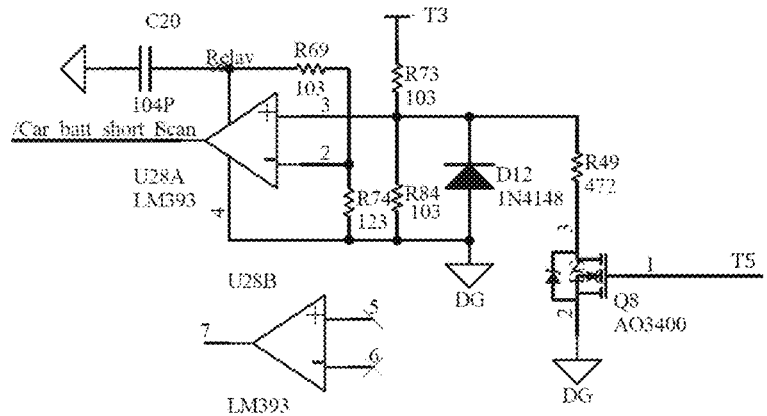
FIG. 5 is a circuit diagram illustrating a short-circuit detecting module of the power control circuit shown in FIG. 2.

In some cases, the two output terminals T3 and T5 of the power control circuit 200 shown in FIG. 2 may be short-circuited due to operation mistakes or other reasons. Therefore, in some embodiments, the power control circuit 200 may also include a short-circuit detecting module (not shown). FIG. 5 is a circuit diagram illustrating a short-circuit detecting module of the power control circuit shown in FIG. 2. The short-circuit detecting module can detect whether the two output terminals of the power control circuit is short-circuited, and generates a short-circuit detection signal (e.g. signal car batt short scan) accordingly. Thus, the control module can determine whether the output terminal is short-circuited according to the short-circuit detection signal, and control the mobile power pack to output current or not.

As shown in FIG. 5, the two output terminals of the short-circuit detecting module are respectively coupled to the two terminals of the power control circuit, which are the terminal T3 shown in FIG. 2 and the terminal T5 or the reference potential shown in FIG. 2. The output terminals of the short-circuit detecting module are coupled to the control module to provide the generated short-circuit detection signal to the control module.

The short-circuit detecting module includes a transistor Q8 and a comparator U28A. Specifically, when the two output terminals of the mobile power pack are not short-circuited, a gate of the transistor Q8 is at the low level, and thus it is cut off and its drain is at the high level. In this case, the level of a positive input terminal of the comparator U28A is higher than that of a negative input terminal of the comparator U28A, and the short-circuit detection signal outputted by the comparator U28A is at the high level, indicating that no short-circuit condition occurs. In contrast, when the two output terminals of the mobile power source is short-circuited, the gate of the transistor Q8 is at the high level, and thus the transistor Q8 is in conducting state, pulling down the level of the positive input terminal of the comparator U28A to lower than that of its negative output terminal. Thus, the short-circuit detection signal outputted by the comparator U28A is reversed to the low level, indicating the short-circuit condition of the two output terminals of the mobile power pack.

Still referring to FIG. 2, as described above, the control module 203 may generate the coupling control signal after receiving the short-circuit detection signal indicating the short-circuit condition between the output terminals of the mobile power pack, to prohibit the current outputting of the first power source 230 and the second power source 240 coupled together. For example, the control module 203 may switch off the first switch K1, the second switch K2 and the third switch K3 simultaneously. As the fourth terminal T4 is floating, the second power source may not output current.

Figure 6:
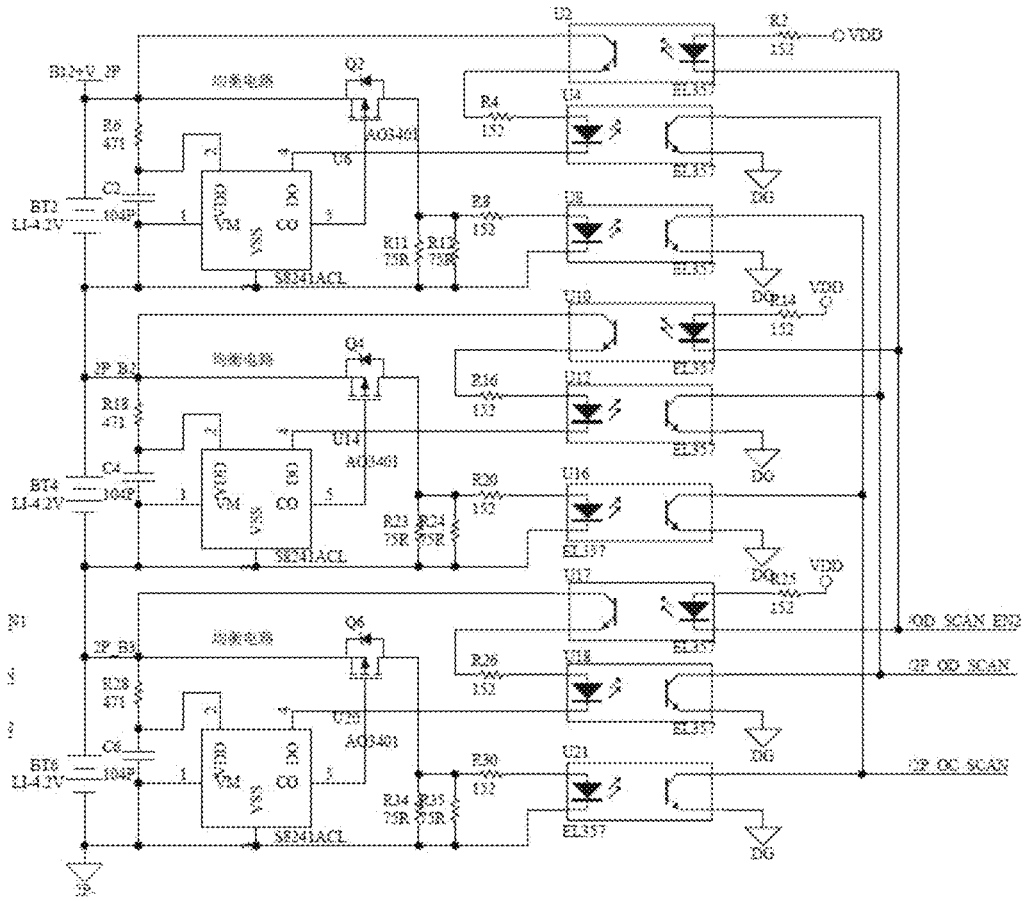
FIG. 6 is a circuit diagram illustrating an equalization and overcharging and over-discharging protection circuit of the battery module of the power control circuit shown in FIG. 2.

In some embodiments, the first power source and the second power source may be a battery pack having several batteries coupled in series. Accordingly, the power control circuit may contain an equalization circuit. When the battery packs are being charged, the equalization circuit can ensure that each battery is equally charged. Moreover, the power control circuit may also include an over-charging or over-discharging circuit to avoid over-charging or over-discharging of the batteries of the battery packs, thereby improving the lifetime of the battery packs. FIG. 6 is a circuit diagram illustrating an equalization and overcharging or over-discharging protection circuits of the battery module in the power control circuit 200 shown in FIG. 2. The structure and operation of the equalization and overcharging or over-discharging protection circuits is similar to those of the existing power equalization and overcharging or over-discharging protection circuits, which will not be elaborated herein.

Figure 7:
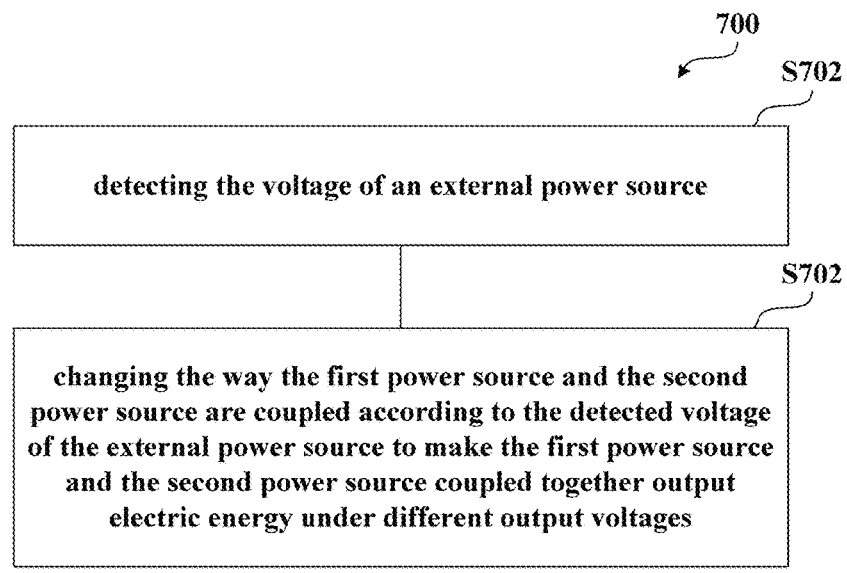
FIG. 7 is a flow chart illustrating a power controlling method 700 according to an exemplary embodiment of the present application.

FIG. 7 shows a power control method 700 according to an exemplary embodiment of the present application. The power control method can be implemented by the power control circuits shown in FIG. 1 or 2 to control the electric energy output from a power source having a first power source module and a second power source module. In applications, the power control method 700 can be used for starting an engine in emergency, for example, starting engines of cars, motorcycles or other vehicles in emergency.

As shown in FIG. 7, the power control method includes: in step S702, detecting the voltage of an external power source; and in step S704, changing the way the first power source and the second power source are coupled according to the detected voltage of the external power source to make the first power source and the second power source coupled together output electric energy under different output voltages.

In some embodiments, the step of changing the way the first and second power sources are coupled includes comparing the detected voltage of the external power source with a first voltage range and a second voltage range, coupling the first power source with the second power source in series when the detected voltage of the external power source is within the first voltage range, and coupling the first power source with the second power source in parallel when the detected voltage of the external power source is within the second voltage range.

In some embodiments, the first voltage range includes a range from 14.4 V to 25.4 V, and the second voltage range includes a range from 8.1 V to 12.7 V.

In some embodiments, the method further includes detecting an output current of the first power source and second power source coupled together, comparing the output current with a predetermined reference current, and prohibiting the first power source and the second power source from outputting electric energy when the output current exceeds the predetermined reference current.

In some embodiments, the method further includes: detecting a polarity of the external power source, and determining whether to prohibit the electric energy output from the first power source and the second power source coupled together according to the detected polarity of the external power source.

In some embodiments, the method further includes: detecting the polarity of the external power source; and changing the way the first power source and the second power source are coupled according to the detected polarity of the external power source to couple the external power source with the first power source and the second power source coupled together in a predetermined polarity.

Second Aspect of the Invention

In some cases, an engine can be started in emergency by battery jumping. Specifically, a power source in a normal state (e.g. a backup power source) can be coupled to a power source in an abnormal state (e.g. a failed power source) or a failed engine to start the engine using the normal power source. However, the user needs to make sure that the negative and positive electrodes of the two power sources are correctly coupled, otherwise short circuit condition may occur, which may damage the power source, even cause explosion.

To address the aforesaid problems, the application also provides an electrical connection device. The electrical connection device can automatically adjust the way the two power sources are coupled according to the voltage polarities of the coupled power sources, to ensure that their positive and negative electrodes are coupled correctly.

Figure 8:
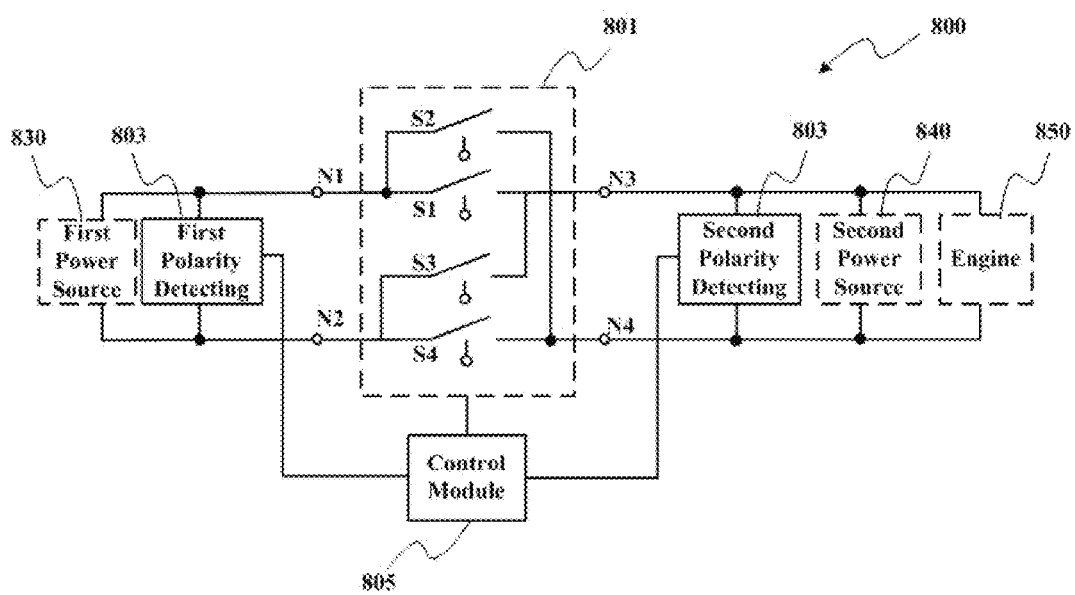
FIG. 8 is a circuit diagram illustrating an electrical connection device 800 according to an embodiment of the present application.

FIG. 8 shows an electrical connection device 800 according to an exemplary embodiment of the present application. In applications, the electrical connection device 800 can be used for coupling two external power sources such as car power sources together to transfer electric energy therebetween. Alternatively, the electrical connection device can be used for coupling an external power source to anther external power source and a load (e.g. an engine) to provide electric energy to the load, e.g. for starting the engine in emergency.

As shown in FIG. 8, the electrical connection device 800 includes a coupling module 801 which has a first terminal N1, a second terminal N2, a third terminal N3 and a fourth terminal N4. The first terminal N1 and the second terminal N2 are used in a pair, and coupled to the first power source 830 when in use. The third terminal N3 and the fourth terminal N4 are used in a pair, and coupled to the second power source 840 when in use. For example, the first power source 830 is a power source in a normal state, and the second power source 840 is a power source in an abnormal state such as in an over-discharging state. The second power source 840 is usually coupled to an engine 850 such that the first power source 830 is also coupled to the engine 850.

The first terminal N1 and the second terminal N2 may be operably and selectively coupled to the third terminal N3 and the fourth terminal N4, such that the first power source 830 may be operably coupled to the second power source 840 and the engine 850. Specifically, the first terminal N1 may be operably coupled to one terminal of the third terminal N3 and the fourth terminal N4, and the second terminal N2 may be operably coupled to the other terminal of the third terminal N3 and the fourth terminal N4. Therefore, the first power source 830 can provide a starting current to the engine 850 through the electrical connection device 800 transferring the electric energy, to start the engine 850 in emergency. Alternatively, the first power source 830 can charge the second power source 840.

In the embodiments shown in FIG. 8, the coupling module 801 includes a first switch S1 coupled between the first terminal N1 and the third terminal N3, a second switch S2 coupled between the first terminal N1 and the fourth terminal N4, a third switch S3 coupled between the second terminal N2 and the third terminal N3, and a fourth switch S4 coupled between the second terminal N2 and the fourth terminal N4. The on or off state of these switches may affect the way the terminals N1 and N2 are coupled with the terminals N3 and N4, and thus change the way the first power source 830 and the second power source 840 are coupled. It will be appreciated that, in some other embodiments, the coupling module 801 may include different numbers of switches to couple the four terminals N1-N4 via various paths.

The electrical connection device 800 further includes a polarity detecting module 803, which is used to detect a first polarity between the first terminal N1 and the second terminal N2 and detect a second polarity between the third terminal N3 and the fourth terminal N4. In the embodiment shown in FIG. 8, the polarity detecting module 803 includes two polarity detecting modules, i.e. a first polarity detecting module and a second polarity detecting module. In this case, two input terminals of the first polarity detecting module are respectively coupled to the first terminal N1 and the second terminal N2 to obtain a voltage difference therebetween, and the first polarity detecting module further determines the first polarity between the first terminal N1 and the second terminal N2 according to the obtained voltage difference. The first polarity is corresponding to the polarity of the first power source 830 coupled between the first terminal N1 and the second terminal N2. For example, when the first power source 830 has its positive electrode coupled to the first terminal N1 and its negative electrode coupled to the second terminal N2, the first polarity is positive, i.e. the voltage of the first terminal N1 is higher than that of the second terminal N2. Conversely, when the first power source 830 has its negative electrode coupled to the first terminal N1 and its positive electrode coupled to the second terminal N2, the first polarity is negative, i.e. the voltage of the first terminal N1 is lower than that of the second terminal N2. The first polarity detecting module may generate a first polarity detection signal indicating the first polarity. Similarly, two input terminals of the second polarity detecting module are respectively coupled to the third terminal N3 and the fourth terminal N4 to obtain a voltage difference therebetween, and the second polarity detecting module further determines the second polarity between the third terminal N3 and the fourth terminal N4 according to the obtained voltage difference. The second polarity detecting module may generate a second voltage detection signal indicating the second polarity.

Figure 9:
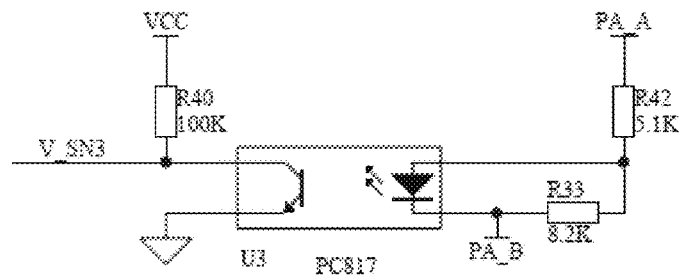
FIG. 9 is a circuit diagram illustrating a polarity detecting module of the electrical connection device 800 shown in FIG. 8.

FIG. 9 is a circuit diagram illustrating the first polarity detecting module of the electrical connection device 800 shown in FIG. 8. The second polarity detecting module may have a structure the same as or similar to that of the first polarity detecting module.

As shown in FIG. 9, the first polarity detecting module includes a voltage divider having a resistor R42 and a resistor R33 and an optocoupler PC817. Two terminals of the voltage divider are coupled to the first terminal PA_A (corresponding to the first terminal N1 shown in FIG. 8) and the second terminal PB_B (corresponding to the second terminal N1 shown in FIG. 8) respectively, to detect the voltage difference between the two terminals of the first power source. A signal generated by the voltage divider is provided to the optocoupler U3. When the voltage of the first terminal PA_A is higher than that of the second terminal PA_B, the optocoupler U3 is in the conducting state, and thus an output terminal V_SN3 of the first polarity detecting module is at the low level. Conversely, when the voltage of the first terminal PA_A is lower than that of the second terminal PA_B, the optocoupler U3 is cut off, and thus the output terminal V_SN3 of the first polarity detecting module is at the high level. In other words, the first polarity detecting module may generate the first polarity detection signal indicating the first polarity according to the voltage difference between the first terminal and the second terminal. Similarly, the second polarity detecting module may generate the second polarity detection signal indicating the second polarity according to the voltage difference between the third terminal and the fourth terminal.

It will be appreciated that the circuit schematic of the polarity detecting module shown in FIG. 8 is merely illustrative, and in practical applications, various modifications and changes can be made. For example, the polarity detecting module can be implemented using only a group of voltage divider and photodiode, while a multiplexing switch can be used to select detecting the polarity between the first terminal and the second terminal or between the third terminal and the fourth terminal. In other words, the polarity detecting module operates in a time division multiplexing detection manner.

Still referring to FIG. 8, the electrical connection device 800 also includes a control module 805, which is coupled to the first polarity detecting module and the second polarity detecting module to receive the first polarity detection signal and the second polarity detection signal, respectively. The control module 805 generates a coupling control signal according to the first polarity detection signal and the second polarity detection signal, and is coupled to the coupling module 801 to change the way the terminals N1 and N2 are coupled with the terminals N3 and N4. When coupled together, the polarity between the first terminal N1 and second terminal N2 is the same as the polarity between the third terminal N3 and fourth terminal N4.

Specifically, if the first polarity detection signal is the same as the second polarity detection signal, i.e. the way the first power source 830 is coupled with the first and second terminals is the same as the way the second power source 840 is coupled with the third and fourth terminals, then the control module 805 may couple the first terminal N1 with the third terminal N3, and couple the second terminal N2 with the fourth terminal N4. In this case, the positive electrode of the first power source 830 is coupled to the positive electrode of the second power source 840, and the negative electrode of the first power source 830 is coupled to the negative electrode of the second power source 840. In this way, the first power source 830 can charge the second power source 840 or start the engine 850 in emergency. For the embodiment shown in FIG. 8, the first terminal N1 is coupled to the third terminal N3, and the second terminal N2 is coupled to the fourth terminal N4 when the first switch S1 and the fourth switch S4 are switched on while the second switch S2 and the third switch S3 are switched off.

If the first polarity detection signal is opposite to the second polarity detection signal, i.e. the way the first power source 830 is coupled with the first terminal and the second terminal is opposite to the way the second power source is coupled with the third terminal and the fourth terminal, then the control module 805 may couple the first terminal N1 with the fourth terminal N4, and couple the second terminal N2 with the third terminal N3. In this case, the electrical connection device 800 ensures that the positive electrode of the first power source 830 is coupled to the positive electrode of the second power source 840, and the negative electrode of the first power source 830 is coupled to the negative electrode of the second power source 840. For the embodiment shown in FIG. 8, the first terminal N1 is coupled to the fourth terminal N4, and the second terminal N2 is coupled to the third terminal N3 when the first switch S1 and the fourth switch S4 are switched off while the second switch S2 and the third switch S3 are switched on.

In some embodiments, the electrical connection device may also include a voltage detecting module (not shown). Specifically, the voltage detecting module may include two sub-modules, i.e. a first voltage detecting module coupled between the first terminal and the second terminal to detect a voltage amplitude therebetween, and a second voltage detecting module coupled between the third terminal and the fourth terminal to detect a voltage amplitude therebetween. Accordingly, the control module may compare the voltage amplitude between the first and second terminals with the voltage amplitude between the third and fourth terminals, and generate the coupling control signal of disconnecting the terminals N1 and N2 from the terminals N3 and N4 when the two voltage amplitudes do not match with each other, i.e. the two voltage amplitudes fall within two different ranges. This ensures that the power sources with different voltages would not be coupled with each other, thereby avoiding some dangers, for example, avoiding coupling a 12V power source with a 24V power source. The two voltage amplitudes within different voltage ranges refer to that the specifications of the corresponding power sources are different. For example, the backup power source may be the 12V power source having an output voltage amplitude of 12.5V which is within a range from 8.1V to 13.5V (corresponding to the possible output voltage of the 12V power source); and the failed power source may be the 24V power source having an output voltage amplitude of 19.5V which is within a range from 14.4V to 25.4V (corresponding to the possible output voltage of the 24V power source). If the voltage amplitudes between the two pairs of terminals are within the same voltage range, for example, the voltage amplitude between one pair of terminals is 12.1V and the voltage amplitude between the other pair of terminals is 9.6V, then the two power sources are deemed as having the same specification.

Figure 10:
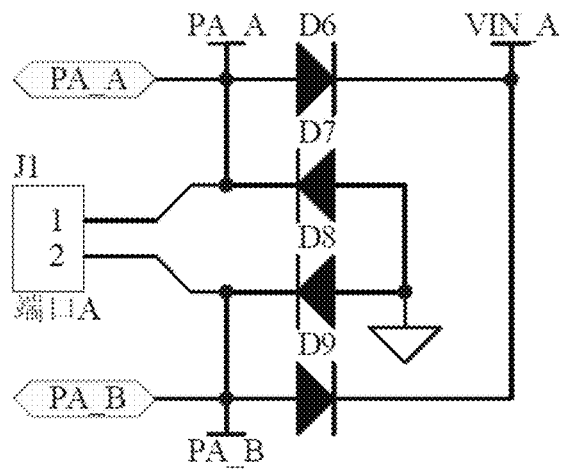
FIG. 10 is a circuit diagram illustrating a polarity orientation module of the electrical connection device 800 shown in FIG. 8.
Figure 11:
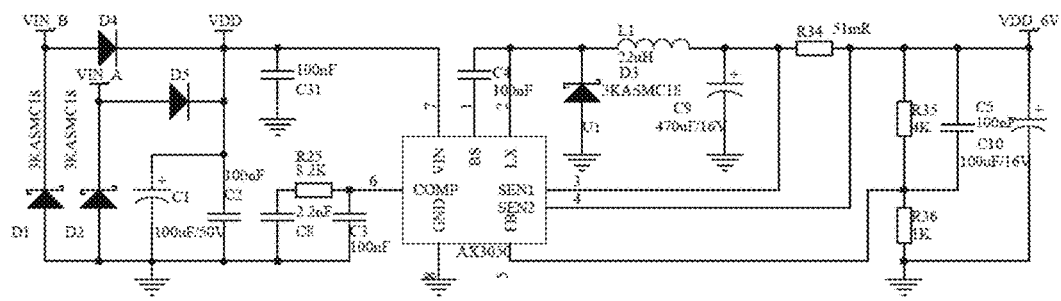
FIG. 11 is a circuit diagram illustrating a voltage converting module of the electrical connection device 800 shown in FIG. 8.
Figure 12:
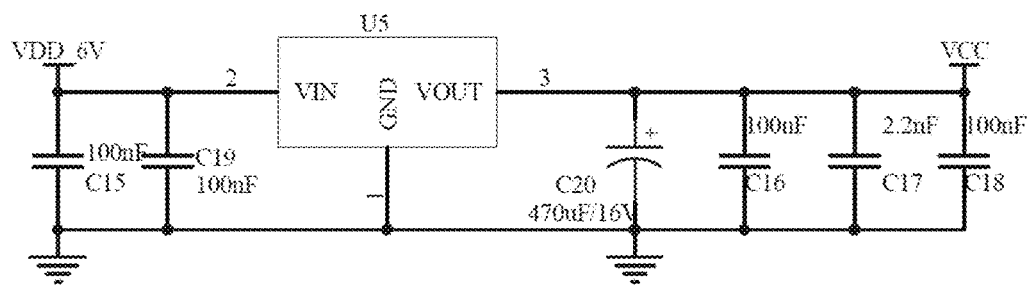
FIG. 12 is a circuit diagram illustrating a low dropout regulator of the electrical connection device 800 shown in FIG. 8.

For the electrical connection device 800 shown in FIG. 8, various modules thereof can be powered by an independent power source, or optionally, can be powered by the first power source 830 and/or second power source 840. FIGS. 10 to 12 show a power supply circuit using the first power source 830 and/or the second power source 840 to power the electrical connection device 800. The power supply circuit can generate a DC working power supply required by the other circuit modules of the electrical connection device 800. In some embodiments, the power supply circuit includes a polarity orientation module shown in FIG. 10 and a voltage converting module shown in FIG. 11. In other embodiments, the power supply circuit may also include a regulator such as a low dropout regulator shown in FIG. 12.

FIG. 10 shows a circuit diagram of a first polarity orientation module coupled to the first terminal and the second terminal. Similarly, a second polarity orientation module coupled to the third terminal and the fourth terminal may have a schematic the same as or similar to the schematic of the first polarity orientation module.

As shown in FIG. 10, the first polarity orientation module includes four diodes. A first diode D6 is coupled between a first terminal PA_A (corresponding to the first terminal N1 in FIG. 8) and an intermediate terminal VIN_A. A second diode D7 is coupled between the first terminal PA_A and ground. A third diodes D8 is coupled between a second terminal PA_B (corresponding to the second terminal N2 in FIG. 8) and ground. A fourth diodes D9 is coupled between the second terminal PA_and the intermediate terminal VIN_A. It can be seen that, no matter how the first terminal PA_A and the second terminal PA_B are coupled to the first power source, the intermediate terminal VIN_A outputs a voltage with a predetermined polarity (positive in FIG. 10) and an amplitude equal to the absolute value of the voltage difference between the first terminal PA_A and the second terminal PA_B.

FIG. 11 shows a voltage converting module coupled to the first polarity orientation module and the second polarity orientation module. As shown in FIG. 11, the voltage converting module is coupled to the intermediate terminal VIN_A of the first polarity orientation module, and is also coupled to the intermediate terminal VIN_B of the second polarity orientation module, to receive voltage output from one of the two polarity orientation modules. The voltage converting module is a DC-DC buck circuit which converts the 12V or 24V voltage of the power source to working voltage for at least some of modules of the electrical connection circuit, e.g. 8 V or 6 V.

FIG. 12 shows a low dropout regulator (LDO) coupled to the voltage converting module shown in FIG. 11, which further converts the working voltage to a lower voltage such as 5V or lower, to power some modules of the electrical connection device 800.

Still referring to FIG. 8, in applications, the electrical connection device 800 may be used for starting the engine 850. Therefore, the first power source 830 does not need to keep in connection with the second power source 840 and the engine 850 for a long period. Moreover, in some conditions, the long-time connection between the first power source 830 and the second power source 840 and the engine 850 should be avoid. This is because that the terminals N1-N4 of the electrical connection device 800 may be disconnected from the first power source 830 and the second power source 840 due to improper operation. For example, the negative electrode of the second power source 840 may be disconnected from the fourth terminal N4, then it may be dangerous if the on or off state of the switches of the coupling module 801 is kept unchanged. Therefore, in some embodiments, the control module 805 may record how long the coupling control signal of maintaining coupling the terminals N1 and N2 with the terminals N3 and N4 (i.e. two of the switches are switched on) lasts. The control module 805 may further generate the coupling control signal of disconnecting the first power source 830 from the second power source 840 when the outputting lasts more than a first predetermined period. In some embodiments, the first predetermined period is, for example, 1 to 10 seconds, and preferably 2 to 5 seconds. Furthermore, after a second predetermined period has passed since the coupling control signal of disconnecting the first power source 830 from the second power source 840 is output, the control module obtains again the first polarity detection signal and the second polarity detection signal, and regenerates the coupling control signal according to the comparison result of the two polarity detection signals, to keep coupling the terminals N1 and N2 with the terminals N3 and N4 in the same polarity. In some embodiments, the second predetermined period is 0.2 to 5 seconds, and preferably 0.5 to 1 second. For example, the control module 805 may disconnect the first power source 830 from the second power source 840 for 0.5 second after coupling the first power source 830 with the second power source 840 for 5 seconds, and then repeats the operations.

Figure 13:
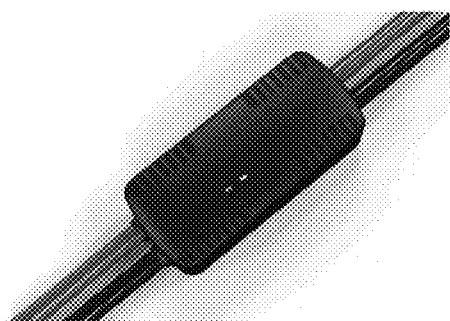
FIG. 13 illustrates the appearance of the electrical connection device 800 shown in FIG. 8.

FIG. 13 shows the appearance of the electrical connection device 800 shown in FIG. 8. As shown in FIG. 13, the four terminals of the electrical connection device are respectively lead out by conducting wires and further connected to the power source. Each of these conducting wires may have a clamp at its end to clamp an electrode of the power source. In some embodiments, the electrical connection device 800 may be a jumper for connecting vehicle batteries.

Figure 14:
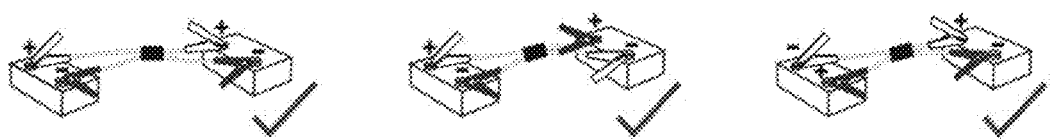
FIG. 14 illustrates the electrical connection device 800 shown in FIG. 8 connecting two power sources.

FIG. 14 shows the electrical connection device shown in FIG. 8 connecting two power sources. It can be seen that however the first and second terminals and the third and fourth terminals are coupled to the first power source and the second power source, the electrical connection device can automatically identify the polarity of the two power sources and ensure that the positive and negative electrodes of the first power source and the second power source can be coupled with each other correspondingly.

In some embodiment of the application, the control module shown in FIG. 1 and FIG. 2 and the control module shown in FIG. 8 can be implemented by one or more application-specific integrated circuits (ASIC), digital signal processors (DSP), digital signal processing device (DSPD), programmable logic devices (PLD), field-programmable gate arrays (FPGA), controllers, micro-controllers, microprocessors or other electric devices.

It should be noted that, although several modules or sub-modules of the power control circuits and the electrical connection devices have been described in the previous paragraphs, such division is exemplary and not mandatory. Practically, according to the embodiments of the present application, the functions and features of two or more modules described above may be embodied in one module. Conversely, the function and feature of any one module described above may be embodied in two or more modules.

Furthermore, although the operation of a method according to the present application is illustrated with reference to the accompanying drawings in a specific sequence, the present application may be practiced using process flows that differ from that illustrated. Additionally, it should be noted that not all steps are required in every embodiment. In other words, one or more of the steps may be omitted or replaced, without departing from the spirit and scope of the invention. In certain embodiments, steps may be performed in different order, in parallel with one another, or omitted entirely, and/or certain additional steps may be performed without departing from the scope of the present application.

Other variations to the disclosed embodiments can be understood and effected by those skilled in the art in practicing the claimed invention, from a study of the drawings, the application, and the appended claims. In the claims, the word "comprising" does not exclude other elements or steps, and the indefinite article "a" or "an" does not exclude a plurality. Any reference signs in the claims should not be construed as limiting the scope. The scope and spirit of the present application is defined by the appended claims.

What is claimed is:

1. A mobile power pack having a first power source, a second power source and a power control circuit, wherein the power control circuit comprises:
    a voltage detecting module configured to detect a voltage of an external power source and generate a voltage detection signal indicative of the voltage of the external power source;
    a control module configured to receive the voltage detection signal and generate a coupling control signal according to the voltage detection signal; and
    a coupling module configured to operably couple the first power source with the second power source, receive the coupling control signal, and in response to the coupling control signal, change the way the first power source and the second power source are coupled so that the first power source and second power source output electric energy under different output voltages.

2. The mobile power pack according to claim 1, wherein the control module is further configured to compare the voltage detection signal with a first voltage range and a second voltage range, and generate the coupling control signal of coupling the first power source with the second power source in series when the voltage detection signal is within the first voltage range, or generate the coupling control signal of coupling the first power source with the second power source in parallel when the voltage detection signal is within the second voltage range.

3. The mobile power pack according to claim 2, wherein the control module is further configured to generate the coupling control signal of disconnecting the first power source from the second power source when the voltage detection signal is out of the first voltage range and the second voltage range.

4. The mobile power pack according to claim 2, wherein the first voltage range comprises a range from 14.4V to 25.4V, and the second voltage range comprises a range from 8.1V to 12.7 V.

5. The mobile power pack according to claim 1, wherein the coupling module comprises:
    a first terminal and a second terminal configured to couple with a positive electrode and a negative electrode of the first power source, respectively;

a third terminal and fourth terminal configured to couple with a positive electrode and a negative electrode of the second power source, respectively;

wherein the first power source and second power source are coupled to output electric energy between the third terminal and the second terminal.

6. The mobile power pack according to claim 5, wherein the coupling module comprises:

a first switch coupled between the first terminal and the third terminal;

a second switch coupled between the first terminal and the fourth terminal;

a third switch coupled between the second terminal and the fourth terminal;

and wherein the control module is configured to compare the voltage detection signal with the first voltage range and the second voltage range, generate the coupling control signal of switching on the second switch and switching off the first and third switches when the voltage detection signal is within the first voltage range, and generate the coupling control signal of switching on the first and third switches and switching off the second switch when the voltage detection signal is within the second voltage range.

7. The mobile power pack according to claim 6, wherein the coupling module comprises:

a switch driving module configured to receive the coupling control signal and provide it to the first, second and third switches to control the on/off state of the first, second and third switches, wherein the switch driving module is further configured to prohibit switching on the second switch while the first switch and/or the third switch are switched on.

8. The mobile power pack according to claim 5, wherein the external power source is coupled between the third terminal and the second terminal, and the voltage detecting module is coupled between the third terminal and the second terminal to detect the voltage of the external power source.

9. The mobile power pack according to claim 8, wherein the voltage detecting module comprises a voltage divider configured to divide the detected voltage of the external power source to obtain the voltage detection signal.

10. The mobile power pack according to claim 1, wherein the control module is further configured to receive a manual input signal, and generate the coupling control signal of permitting the electric energy output from the first power source and the second power source coupled together in response to the manual input signal.

11. The mobile power pack according to claim 10, wherein the control module is further configured to track the timing of the electric energy output responsive to the manual input signal, and output the coupling controlling signal of prohibiting the electric energy output from the first power source and the second power source coupled together after a predetermined period.

12. The mobile power pack according to claim 1, wherein the mobile power pack is used for starting an engine.

13. A power control method for controlling electric energy output from a power source of a first power source and a second power source, comprising:

detecting a voltage of an external power source; and changing the way the first power source and the second power source are coupled so as to control the first power source and the second power source coupled together to output electric energy under different output voltages.

14. The method according to claim 13, wherein the step of changing the way the first power source and the second power source are coupled comprises:

comparing the detected voltage of the external power source with a first voltage range and a second voltage range, and coupling the first power source with the second power source in series when the detected voltage of the external power source is within the first voltage range; or coupling the first power source with the second power source in parallel when the detected voltage of the external power supply is within the second voltage range.

15. The method according to claim 14, wherein the first voltage range comprises a range from 14.4V to 25.4V, and the second voltage range comprises a range from 8.1V to 12.7V.

16. The method according to claim 13, wherein the method is used for starting an engine.

17. An electrical connection device, comprising:

a coupling module having a first terminal, a second terminal, a third terminal and a fourth terminal, wherein the first terminal is operably coupled to one of the third and fourth terminals, and the second terminal is operably coupled the other of the third and fourth terminals;

a polarity detecting module configured to detect a first polarity between the first terminal and the second terminal and detect a second polarity between the third terminal and the fourth terminal; and a control module configured to generate a coupling control signal according to the detected first and second polarities in order to control the way the first and second terminals are coupled with the third and fourth terminals such that the first polarity between the first terminal and the second terminal is same as the second polarity between the third terminal and the fourth terminal;

a first polarity orientation module having two input terminals coupled to the first terminal and the second terminal, respectively, wherein the first polarity orientation module is configured to convert the voltage difference received between the two input terminals into a voltage with a predetermined polarity; and/or a second polarity orientation module having two input terminals coupled to the third terminal and the fourth terminal, respectively, wherein the second polarity orientation module is configured to convert the voltage difference received between the two input terminals into a voltage with a predetermined polarity;

a voltage converting module configured to receive an output voltage from the first polarity orientation module and/or the second polarity orientation module, and convert it to a voltage having a predetermined amplitude for supplying other components of the electrical connection device.

18. The electrical connection device according to claim 17, wherein the polarity detecting module comprises:

a first optocoupler coupled between the first terminal and the second terminal, and configured to generate a first polarity detection signal indicating the first polarity according to a voltage difference between the first terminal and the second terminal; and a second optocoupler coupled between the third terminal and the fourth terminal, and configured to generate a second polarity detection signal indicating the second polarity according to a voltage difference between the third terminal and the fourth terminal.

19. The electrical connection device according to claim 18, wherein the polarity detecting module further comprises:
- a first voltage divider configured to divide the voltage difference between the first terminal and the second terminal and pass the divided voltage to an input terminal of the first optocoupler;
- a second voltage divider configured to divide the voltage difference between the third terminal and the fourth terminal and pass the divided voltage to an input terminal of the second optocoupler; and
- wherein the first optocoupler generates the first polarity detection signal indicating the first polarity according to the divided voltage difference between the first terminal and the second terminal; and the second optocoupler generates the second polarity detection signal indicating the second voltage polarity according to the divided voltage difference between the third terminal and the fourth terminal.

20. The electrical connection device according to claim 17, further comprising:
- a first voltage detecting module coupled between the first terminal and the second terminal to detect a voltage amplitude therebetween;
- a second voltage detecting module coupled between the third terminal and the fourth terminal to detect a voltage amplitude therebetween;
- wherein the control module is further configured to compare the voltage amplitude between the first and second terminals with the voltage amplitude between the third and fourth terminals, and generate the coupling control signal of disconnecting the first and second terminals from the third and fourth terminals when the two voltage amplitudes do not match with each other.

21. The electrical connection device according to claim 17, wherein the coupling module further comprises:
- a first switch coupled between the first terminal and the third terminal;
- a second switch coupled between the first terminal and the fourth terminal;
- a third switch coupled between the second terminal and the third terminal;
- a fourth switch coupled between the second terminal and the fourth terminal; and
- the controlling module is further configured to generate the coupling control signal of switching on the first and fourth switches and switching off the second and third switches, or the coupling control signal of switching on the second and third switches and switching off the first and fourth switches according the first polarity and the second polarity.

22. The electrical connection device according to claim 21, wherein the control module is further configured to compare the voltage amplitude between the first and second terminals with the voltage amplitude between the third and the fourth terminals; and generate the coupling control signal of switching off the first, second, third and fourth switches when the two voltage amplitudes do not match with each other.

23. The electrical connection device according to claim 17, wherein the control module is further configured to record how long the coupling control signal of maintaining coupling of the first and second terminals with the third and fourth terminals lasts, and generate the coupling control signal of disconnecting the first and second terminals from the third and fourth terminals when the outputting lasts more than a first predetermined period;
- the control module is further configured to, after a second predetermined period has passed since the coupling control signal of disconnecting the first and second terminals from the third and fourth terminals is output, generate the coupling control signal of coupling the first and second terminals with the third and fourth terminals again based on the detected first polarity and second polarity.

24. The electrical connection device according to claim 17, wherein the electrical connection device is used for starting an engine, wherein the first terminal and the second terminal are coupled to positive and negative electrodes of a backup power source, and the third terminal and the fourth terminal are coupled to positive and negative electrodes of a failed power source associated with the engine.

* * * * *